United States Patent
Orth et al.

(10) Patent No.: US 10,737,463 B2
(45) Date of Patent: Aug. 11, 2020

(54) METHOD FOR PRODUCING A SANDWICH PANEL COMPRISING A REINFORCED FOAM CORE

(71) Applicant: AIRBUS DEFENCE AND SPACE GMBH, Taufkirchen (DE)

(72) Inventors: Tilman Orth, Taufkirchen (DE); Jonas Gruenewald, Taufkirchen (DE); Patricia Parlevliet, Taufkirchen (DE)

(73) Assignee: Airbus Defence and Space GmbH, Taufkirchen (DE)

(*) Notice: Subject to any disclaimer, the term of this patent is extended or adjusted under 35 U.S.C. 154(b) by 158 days.

(21) Appl. No.: 15/636,154

(22) Filed: Jun. 28, 2017

(65) Prior Publication Data
US 2018/0001593 A1   Jan. 4, 2018

(30) Foreign Application Priority Data
Jun. 29, 2016 (EP) .................................. 16176980

(51) Int. Cl.
*B32B 5/00* (2006.01)
*B29C 70/00* (2006.01)
(Continued)

(52) U.S. Cl.
CPC .............. *B32B 5/18* (2013.01); *B29C 70/086* (2013.01); *B29C 70/68* (2013.01); *B29D 24/002* (2013.01);
(Continued)

(58) Field of Classification Search
CPC .. B32B 5/18; B32B 5/22; B32B 9/045; B32B 9/046; B32B 27/04; B32B 27/06;
(Continued)

(56) References Cited

U.S. PATENT DOCUMENTS

| 4,013,810 A * | 3/1977 | Long ..................... B29C 70/025 428/313.9 |
| 5,096,526 A | 3/1992 | Engwall |

(Continued)

FOREIGN PATENT DOCUMENTS

| DE | 4323590 A1 | 3/1994 |
| DE | 102005024408 A1 | 11/2006 |

(Continued)

OTHER PUBLICATIONS

German Search Report for Application No. 16176980 dated Jan. 5, 2017.

*Primary Examiner* — Linda L Gray
(74) *Attorney, Agent, or Firm* — Jenkins, Wilson, Taylor & Hunt, P.A.

(57) ABSTRACT

A method for producing a sandwich panel with a reinforced foam core includes inserting rod-shaped, thermoplastic reinforcing elements into a thermoplastic foam material such that the reinforcing elements extend through the foam material. End regions of the reinforcing elements project out of the foam material. The foam material is thermoformed to form a reinforced foam core, wherein the end regions of the reinforcing elements are integrally formed by applying temperature and pressure to the cover surfaces of the foam material and are bonded to the foam material in a fused connection. A thermoplastic cover layer is laminated on either side by applying temperature and pressure to the reinforced foam core on the cover surfaces of the foam material in order to form the sandwich panel, wherein the cover layers are bonded to the reinforced foam core in a fused connection.

16 Claims, 1 Drawing Sheet

(51) Int. Cl.

| | | |
|---|---|---|
| *B29D 24/00* | (2006.01) | |
| *B32B 7/00* | (2019.01) | |
| *B32B 37/00* | (2006.01) | |
| *B29C 44/00* | (2006.01) | |
| *B32B 5/18* | (2006.01) | |
| *B29C 70/08* | (2006.01) | |
| *B29C 70/68* | (2006.01) | |
| *B32B 5/24* | (2006.01) | |
| *B32B 27/30* | (2006.01) | |
| *B32B 27/28* | (2006.01) | |
| *B32B 27/06* | (2006.01) | |
| *B32B 27/32* | (2006.01) | |
| *B32B 7/04* | (2019.01) | |
| *B32B 27/36* | (2006.01) | |
| *B32B 27/34* | (2006.01) | |
| *B32B 37/06* | (2006.01) | |
| *B32B 37/10* | (2006.01) | |
| B29C 44/56 | (2006.01) | |
| B29K 105/04 | (2006.01) | |
| B29K 71/00 | (2006.01) | |
| B29K 101/12 | (2006.01) | |
| B29K 77/00 | (2006.01) | |
| B29K 67/00 | (2006.01) | |
| B29K 69/00 | (2006.01) | |
| B29K 55/02 | (2006.01) | |
| B29K 23/00 | (2006.01) | |

(52) U.S. Cl.
CPC ............. *B32B 5/245* (2013.01); *B32B 7/04* (2013.01); *B32B 27/06* (2013.01); *B32B 27/065* (2013.01); *B32B 27/281* (2013.01); *B32B 27/286* (2013.01); *B32B 27/288* (2013.01); *B32B 27/302* (2013.01); *B32B 27/32* (2013.01); *B32B 27/34* (2013.01); *B32B 27/36* (2013.01); *B32B 27/365* (2013.01); *B32B 37/06* (2013.01); *B32B 37/10* (2013.01); *B29C 44/5618* (2013.01); *B29C 44/5636* (2013.01); *B29K 2023/12* (2013.01); *B29K 2055/02* (2013.01); *B29K 2067/003* (2013.01); *B29K 2067/006* (2013.01); *B29K 2069/00* (2013.01); *B29K 2071/00* (2013.01); *B29K 2077/00* (2013.01); *B29K 2101/12* (2013.01); *B29K 2105/04* (2013.01); *B32B 2250/40* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2266/025* (2013.01); *B32B 2266/0214* (2013.01); *B32B 2266/0228* (2013.01); *B32B 2266/0257* (2013.01); *B32B 2266/0264* (2013.01); *B32B 2307/50* (2013.01); *B32B 2310/0843* (2013.01); *B32B 2419/00* (2013.01); *B32B 2471/00* (2013.01); *B32B 2479/00* (2013.01); *B32B 2605/08* (2013.01); *B32B 2605/10* (2013.01); *B32B 2605/18* (2013.01)

(58) Field of Classification Search
CPC ....... B32B 27/065; B32B 27/08; B32B 37/18; B32B 37/182; B32B 37/185; B32B 37/04; B32B 37/10; B32B 38/0004; B32B 38/0008; B32B 38/004; B32B 38/047; B32B 2205/40; B32B 2205/24; B32B 2305/022; B32B 2310/0843; B32B 7/04; B32B 7/08; B32B 5/08; B32B 66/272; Y10T 428/24107; Y10T 428/24174; Y10T 428/24182; Y10T 428/249984; Y10T 428/249923; Y10T 428/24008; Y10T 156/1056; Y10T 156/1062; Y10T 156/1304; B29C 66/727; B29C 70/086
USPC .................... 428/119, 120, 317.9, 71, 309.9; 156/303.1, 304.1, 256, 252
See application file for complete search history.

(56) References Cited

U.S. PATENT DOCUMENTS

| | | | |
|---|---|---|---|
| 5,466,506 A | * | 11/1995 | Freitas ................. B29C 70/023 |
| | | | 428/105 |
| 5,800,749 A | | 9/1998 | Lewit et al. |
| 9,289,927 B2 | | 3/2016 | Weber et al. |
| 2001/0031350 A1 | | 10/2001 | Day et al. |
| 2008/0226876 A1 | | 9/2008 | Roth |
| 2010/0255251 A1 | | 10/2010 | Le Roy |
| 2017/0066201 A1 | | 3/2017 | Bieder et al. |

FOREIGN PATENT DOCUMENTS

| | | |
|---|---|---|
| WO | WO 97/16303 A1 | 5/1997 |
| WO | WO 2007/012353 A1 | 2/2007 |
| WO | WO 2011/012587 A1 | 2/2011 |
| WO | WO 2015/090574 A1 | 6/2015 |

* cited by examiner

METHOD FOR PRODUCING A SANDWICH PANEL COMPRISING A REINFORCED FOAM CORE

CROSS-REFERENCE TO RELATED APPLICATION

This application claims priority to European Patent Application 16 176 980.7 filed Jun. 29, 2016, the entire disclosure of which is incorporated by reference herein.

TECHNICAL FIELD

The present disclosure relates to a method for producing sandwich panels comprising reinforced foam cores.

BACKGROUND

Although it has many applications, the present disclosure and the problem addressed thereby is explained in relation to sandwich panels which are designed for cladding passenger cabins of aircraft. In principle, however, the present disclosure can also be used for producing panels for installation in general vehicles, such as road vehicles, railway vehicles and/or watercraft or the like, or in buildings, etc. Panels produced according to the disclosure herein can be used as floor plates, as cladding or cover plates and in the general design of interior spaces.

Because of the good ratio of rigidity or strength to density, sandwich structures or sandwich components, generally referred to in the following as sandwich panels, have a wide range of applications in the field of aircraft construction. Sandwich panels typically consist of a lightweight inner core structure, which is enclosed on either side by a cover layer. By appropriately designing the core structure, both the rigidity of these panels and other properties, such as acoustic or thermal insulation, can be set.

The cover layers are typically made of a fiber composite material, e.g. carbon fiber reinforced plastics material (CFRP). The core structure may for example be honeycomb-like and comprise a plurality of cells having a hexagonal cross section. The cell walls of the honeycomb may be made of a fiber paper impregnated with phenol resin, or of other materials such as cardboard, plastics material, etc. Rigid foam materials are often used as an alternative to a honeycomb construction of this type. These materials have advantages over honeycomb structures, inter alia in the field of thermal and acoustic insulation, and in component production. In order to also ensure sufficient mechanical properties of foam-based core composites in comparison with core composites having a honeycomb-like core structure of a comparable density, techniques are sometimes used in which reinforcing pins, fibers or threads or the like are inserted into rigid foam components. In what is known as the "tied foam core" technique, as described in DE 10 2005 024 408 A1 for example, a foam is penetrated by 'dry' fiber bundles by a sewing technique. Following a resin infiltration process and a subsequent curing process, the fiber bundles form rigid pins, which contribute to mechanically reinforcing the foam.

Known methods of this type for reinforcing foam cores are, however, usually only suitable for reinforcing foamed thermosetting polymers. If, however, fibers were accordingly inserted into a thermoplastic foam, it would be difficult in practice to subsequently infiltrate the fibers with a thermoplastic infusion material due to the high viscosity of thermoplastic polymers. However, foams made of thermoplastic polymers can be deformed into practically any shape under the effects of pressure and temperature, and can be joined to thermoplastic face sheets in short cycle times.

SUMMARY

Against this background, it is an idea of the disclosure herein to form sandwich panels comprising reinforced foam cores made of thermoplastic polymer.

Accordingly, a method for producing a sandwich panel comprising a reinforced foam core is provided. The method includes inserting a plurality of rod-shaped, thermoplastic reinforcing elements into a thermoplastic foam material such that the reinforcing elements extend from a first cover surface of the foam material, through the foam material, to a second cover surface of the foam material. Here, end regions of the reinforcing elements project out of the first cover surface and the second cover surface. The method further includes thermoforming the foam material comprising the reinforcing elements to form a reinforced foam core. Here, the end regions of the reinforcing elements are integrally formed by applying temperature and pressure to the cover surfaces of the foam material and are bonded to the foam material in a fused connection. The method also includes laminating a thermoplastic cover layer on either side by applying temperature and pressure to the reinforced foam core on the cover surfaces of the foam material in order to form the sandwich panel. Here, the cover layers are bonded to the reinforced foam core in a fused connection.

Furthermore, a sandwich panel is provided which has been produced using a method according to the disclosure herein.

A concept underlying the present disclosure involves forming sandwich panels from thermoplastic components by both face sheets and rod-shaped reinforcing elements being bonded to a foam material by a fused connection. In this way, the mechanical properties of sandwich components having a core made of thermoplastic foams can be significantly improved, such that they can accordingly be used to form sandwich components having a thermosetting foam core or a core having a honeycomb structure in situations with substantial loads. By connecting the cover layers, the foam material and the reinforcing elements, force transmission between all three components is achieved. Here, the present disclosure makes use of the fact that all three components can be mixed on a molecular level and a fused joint can be produced, i.e. a bond is formed. Auxiliary structure such as adhesive films or infiltration with synthetic resin or the like can therefore be dispensed with.

Thermoplastic foam materials provide considerable advantages over thermosetting foam materials in terms of their processing properties, and are considerably easier to produce and process. Sandwich panels according to the disclosure herein are therefore quicker, easier, more efficient and ultimately more cost-effective to produce than conventional sandwich panels, for example those having a thermosetting foam core. At the same time, however, sandwich panels according to the disclosure herein provide mechanical characteristic values that are comparable to typical thermosetting sandwich panels.

On the basis of the method according to the disclosure herein, foam cores can be reinforced in a quick and uncomplicated manner. For this purpose, only appropriate reinforcing elements, e.g. pins or the like, need to be inserted in suitable positions in the foam material, e.g. at load introduction points. The rod-shaped reinforcing elements are dimensioned and arranged such that the two ends of the reinforcing elements project out of the foam material. The reinforcing elements are then reshaped and connected, together with the foam material. Here, the projecting ends of the rod-shaped reinforcing elements are melted and pressed into the surface of the foam structure under pressure. The surface of the foam material is ultimately additionally enriched by melted material, meaning that the connection to the cover layers during the joining process can be further improved. Depending on the use or requirements of the finished sandwich panel, the reinforcing elements can be evenly distributed in the foam material. Alternatively, it is of course equally possible to provide a higher number of reinforcing elements in local regions of the foam material, in order to provide certain regions of the sandwich panel with particular reinforcement, for example. Accordingly, non-reinforced regions can also be provided in the foam core. On the basis of the present teaching, it would be immediately clear to a person skilled in the art that both the specific distribution and configuration of the reinforcing elements in the foam material, as well as the foam material and the cover layers themselves, can be configured and optimised in a targeted manner depending on the use. In developments, the reinforcing elements may for example be inserted into the core at different angles, e.g. at insertion angles of between 0° and approximately 75°. This means that the component can be adapted to the predominant load direction. An angle of 0° for example has advantages for compression loading, while a 45° angle is advantageous for shear loading. However, differently oriented reinforcing elements can also be inserted, e.g. 0° at force introduction points and 45° elsewhere, etc.

According to a development, the method may also include forming a plurality of through-holes in the foam material which extend from the first cover surface of the foam material to the second cover surface of the foam material. The reinforcing elements may be inserted into the through-holes. For example, through-holes of this type may be made by drilling or the like. In this case the reinforcing elements then merely have to be pushed into the through-holes.

The through-holes may be formed by melting the foam material. This development has the advantage that the foam material is not removed, but is merely melted. This results in a local increase in density on the side walls of each of the through-holes, and this in turn is advantageous for supporting the reinforcing elements against buckling.

Here, the foam material can be melted using a laser. Using a laser, the through-holes can be melted particularly practically and also precisely.

According to a development, the reinforcing elements can be pointed at least at one end region in each case. In this development, the reinforcing elements are effectively used like drills, drill heads or nails, which penetrate the foam material and displace foam material in the process. Here, the reinforcing elements can remain in position solely due to their shape and/or due to friction.

Therefore, the through-holes can be formed by perforating the foam material using the pointed end regions of the reinforcing elements. The reinforcing elements may be inserted into the foam material manually or mechanically, for example.

According to a development, the end regions of the reinforcing elements may project to an equal extent out of the first cover surface and the second cover surface. In this development, the connection of the cover layers may be particularly even and flat.

According to a development, the reinforcing elements inserted into the foam material may be secured in the foam material by a frictional connection. During the production of the reinforced foam core, the reinforcing elements therefore effectively secure themselves in position until they are fused with the foam material. In principle, it may however also be provided that the reinforcing elements are secured in their positions by an external device or other auxiliary structure during the production of the reinforced foam core.

According to a development, laminating thermoplastic cover layers onto either side of the reinforced foam core facilitates the application of temperature and pressure for thermoforming. In this development, the connection between the reinforcing elements, the foam material and the cover layers can thus be made in one step. By heating the cover layers, sufficient thermal energy can be provided to melt the reinforcing elements and the surface of the foam material such that a fused joint can be achieved.

According to a development, thermoforming and/or the laminating on either side is carried out by a press. In principle, a press of this type can also just be used locally in order to apply pressure and temperature, for example in order to process certain regions having a specific density of reinforcing elements. Other regions may in turn, alternatively or additionally, be processed using other methods and/or manually. One tool that is used could resemble a spot welding gun, for example. In principle, a molding tool may for example be used in order to bring the foam material together with the reinforcing elements into a desired shape. Here, the reinforcing elements projecting out of the foam material may be heated and reshaped or compressed, such that a kind of bead, comparable to a rivet, is formed on the end regions of the reinforcing elements. To form a flat surface, this bead may then be pressed into the foam material and fused therewith.

According to a development, the reinforcing elements, the foam material and/or the cover layers may each contain a thermoplastic polymer.

According to a development, the reinforcing elements, the foam material and/or the cover layers may each contain the same thermoplastic polymer.

According to a development, the reinforcing elements and/or the cover layers may contain reinforcing fibers which are embedded in the relevant thermoplastic polymer. For example, the cover layers may be designed to have a high fiber volume ratio, such that only a little melt-processable polymer is available on the surface for a fused joint. Here, the additional material of the reinforcing elements and/or the foam material may be advantageous, meaning that enough melt-processable material can be available for a fused joint.

According to a development, the relevant thermoplastic polymer may be selected from the group consisting of ABS (acrylonitrile butadiene styrene), PA (polyamide), PBT (polybutylene terephthalate), PC (polycarbonate), PEEK (polyether ether ketone), PEI (polyetherimide), PES (polyethersulfone), PET (polyethylene terephthalate), PP (polypropylene), PPS (polyphenylene sulfide), PPSU (polyphenylsulfone) and PSU (polysulfone) or the like.

The above embodiments and developments can, where appropriate, be combined with one another as desired. Further possible embodiments, developments and implementations of the disclosure herein also include combinations of features of the disclosure herein which are not explicitly mentioned but have either been previously described or are described in the following with reference to the embodiments. In particular, in this case, a person skilled in the art will also add individual aspects as improvements or additions to the relevant basic form of the present disclosure.

BRIEF DESCRIPTION OF THE DRAWINGS

In the following, the present disclosure is described in greater detail with reference to the embodiments set out in the schematic, example drawings, in which.

Figure 1A:
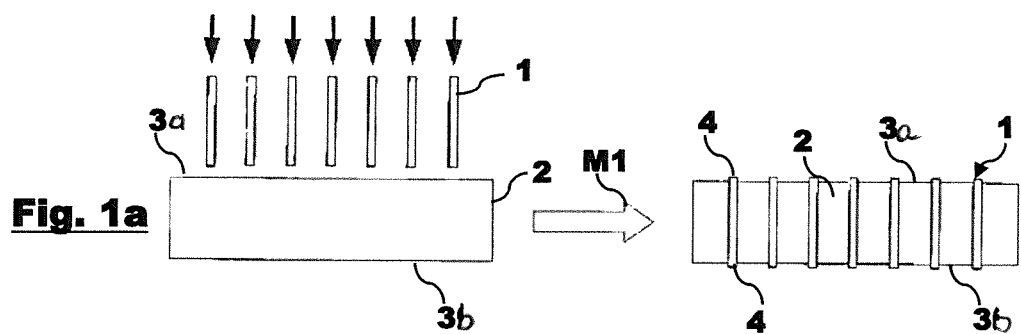
FIGS. 1a to 1c are schematic cross-sectional views of a sandwich panel comprising a reinforced foam core during production using a method according to an embodiment of the disclosure herein.

The accompanying drawings are intended to provide further understanding of the embodiments of the disclosure herein. They illustrate embodiments and are used in conjunction with the description to clarify the principles and concepts of the disclosure herein. Other embodiments and many of the mentioned advantages will become apparent with reference to the drawings. The elements of the drawings are not necessarily shown true to scale relative to one another.

In the figures of the drawings, identical, functionally identical and identically operating elements, features and components have been respectively provided with the same reference numerals, unless indicated otherwise.

DETAILED DESCRIPTION

Figure 1B:
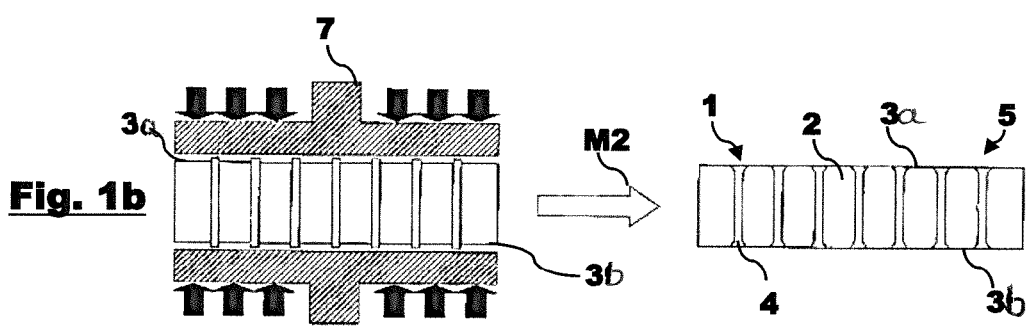
Figure 1C:
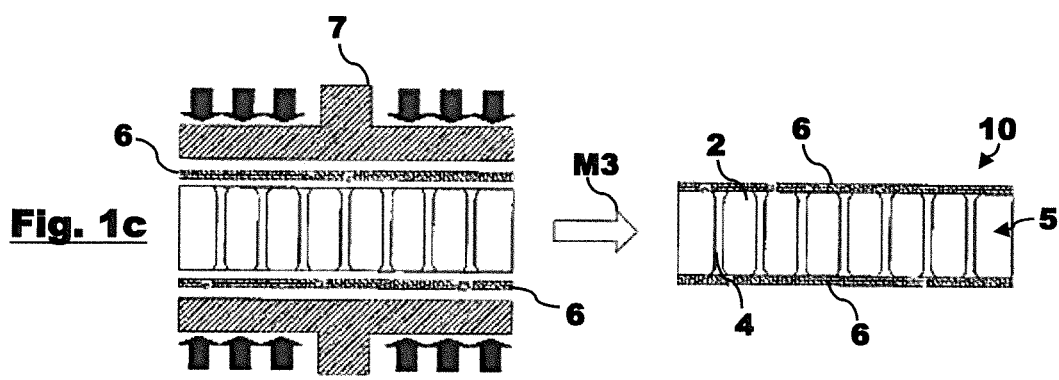
Figure 2:
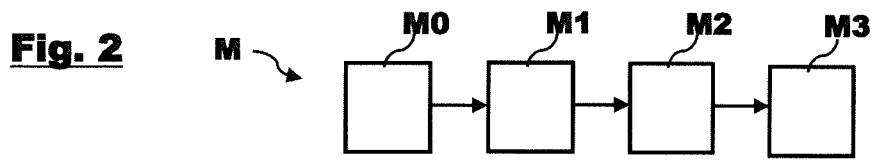
FIG. 2 is a schematic flow chart of a method as used in FIG. 1a to 1c.

FIG. 1a through 1c are schematic cross-sectional views of a sandwich panel 10 comprising a reinforced foam core 5 during production using a method M according to an embodiment of the disclosure herein. FIG. 2 in general shows a schematic flow chart of a method M of this type for producing a sandwich panel 10 of this type.

The sandwich panel 10 essentially comprises a reinforced foam core 5, which has a thermoplastic foam material 2 having a first cover surface 3a and a second cover surface 3b, the foam material 2 being penetrated by a plurality of rod-shaped thermoplastic reinforcing elements 1 in the thickness direction, i.e. from the first cover surface 3a to the second cover surface 3b. The reinforced foam core 5 is connected to the cover surfaces 3a, 3b on either side by one thermoplastic cover layer 6 in each case. A sandwich panel 10 of this type may for example be used for cladding a wall or ceiling of a passenger cabin of an aircraft. Panels of this type can also be used as floor plates, cover plates, etc.

The reinforcing elements 1, the foam material 2 and/or the cover layers 6 may each contain one or more thermoplastic polymers. In this case, thermoplastic polymers may be the same or different. In particular, the foam material 2 may consist completely or substantially comprise a thermoplastic polymer of this type. In principle, the reinforcing elements 1 and the cover layers 6 may consist completely or substantially comprise a thermoplastic polymer of this type. Depending on the use, the relevant thermoplastic polymer may be selected from the group consisting of ABS (acrylonitrile butadiene styrene), PA (polyamide), PBT (polybutylene terephthalate), PC (polycarbonate), PEEK (polyether ether ketone), PEI (polyetherimide), PES (polyethersulfone), PET (polyethylene terephthalate), PP (polypropylene), PPS (polyphenylene sulfide), PPSU (polyphenylsulfone) and PSU (polysulfone) or the like. Specifically in the field of aviation and aerospace, thermoplastic materials such as PEEK, PEI, PES, PPS, PPSU or PSU are advantageous.

Furthermore, the reinforcing elements 1 and/or the cover layers 6 may however also contain reinforcing fibers which are embedded in the relevant thermoplastic polymer. Reinforcing fibers may for example be carbon fibers, glass fibers, aramid fibers or the like. A rod-shaped reinforcing element 1 may, for example, accordingly comprise a plurality of reinforcing fibers which are embedded into a matrix made of thermoplastic polymer, e.g. carbon fibers embedded in a matrix made of PEEK or the like. A reinforcing element 1 of this type accordingly forms a kind of rigid pin. Thermoplastic polymer of the pin can be melted by the effects of temperature. In principle, different designs of the pins or the reinforcing elements 1 may be provided, and may be combined with one another in a sandwich panel 10. For example, variants with or without fiber reinforcement, with or without orientation thereof and with various fiber lengths from short to continuous are provided. The plastics matrix of the reinforcing elements 1 may be made of the same or a different plastics material as the foam material 2, it being necessary for the plastics materials used to be mixable at the molecular level in order to form a bond. The reinforcing elements 1 may have a circular cross section, or another cross section. The reinforcing elements 1 are inserted at an angle of 0° merely by way of example; however, other angles are also possible which may be advantageous for certain load directions. Reinforcing elements 1 may in particular be inserted at various different angles, e.g. different insertion angles of between 0° and 75°.

The method M includes, at M1, inserting a plurality of rod-shaped, thermoplastic reinforcing elements 1 into a thermoplastic foam material 2 such that the reinforcing elements 1 extend from a first cover surface 3a of the foam material 2, through the foam material 2, to a second cover surface 3b of the foam material 2. Here, end regions 4 of the reinforcing elements 1 project out of the first cover surface 3a and the second cover surface 3b. Prior to inserting the rod-shaped, thermoplastic reinforcing elements, the method M may optionally include, at M0, forming a plurality of through-holes 6 in the foam material 2 (not shown in FIG. 1a through 1c) which extend from the first cover surface 3a of the foam material 2 to the second cover surface 3b of the foam material 2. In this case, the reinforcing elements 1 can simply be inserted into the through-holes 6. Here, the through-holes 6 may for example be made by drilling or melting the foam material 2, e.g. using a laser, a particle beam or another suitable auxiliary structure or approach by which energy can be generated in a directed manner in order to melt holes. Alternatively or additionally, it may however also be provided that through-holes 6 are made by perforating the foam material 2 using the reinforcing elements 1. For this purpose, the reinforcing elements 1 may for example have pointed end regions 4, which then accordingly function as nails or drill heads. Following these method steps, the reinforcing elements 1 inserted into the foam material 2 can be temporarily secured in the foam material 2 by a frictional connection, for example. Alternatively or additionally, reinforcing elements 1 may however likewise be held in position by an external device or another auxiliary structure or approach. For example, the reinforcing elements 1 can be inserted into the foam material 2 using a machine and can be held therein by this same machine.

The method M further includes, at M2, thermoforming the foam material 2 comprising the reinforcing elements 1 to form a reinforced foam core 5. Here, the end regions 4 of the reinforcing elements 1 are integrally formed by applying temperature and pressure to the cover surfaces 3a, 3b of the foam material 2 and are bonded to the foam material 2 in a fused connection, i.e. the method involves fusing the reinforcing elements 1 and the foam material 2. Here, a molding tool may for example be used in order to bring the foam material 2 together with the reinforcing elements 1 into a desired shape. The method M further includes, at M3, laminating a thermoplastic cover layer 6 on either side by applying temperature and pressure to the reinforced foam core 5 on the cover surfaces 3a, b' of the foam material 2 in order to form the sandwich panel 10. Here, the cover layers 6 are bonded to the reinforced foam core 5 in a fused connection, i.e. the method involves fusing the cover layers 6 and the reinforced foam core 5. Thermoforming and/or the laminating on either side can be carried out by a press 7. In particular, laminating thermoplastic cover layers 6 onto either side of the reinforced foam core 5 facilitates the application of temperature and pressure for thermoforming. FIGS. 1b and 1c show, by way of example, an embodiment of the method M in which both thermoforming (FIG. 1b) and the laminating (FIG. 1c) are carried out by a press 7 in separate steps. The press 7 applies pressure and temperature to the corresponding components (see arrows in FIGS. 1b and 1c). In principle, the two processes may however also be carried out in one method step by the press 7 applying temperature and pressure to the cover layers 6 such that when the press is pressed against the cover surfaces 3a, 3b of the foam material 2 comprising the reinforcing elements 1 inserted therein, sufficient thermal energy is transferred to the foam material 2 and the end regions 4 of the reinforcing elements 1, and therefore they are melted at least in the region of the surface. Here, the reinforcing elements 1 projecting out of the foam material 2 may be heated and reshaped, such that a kind of bead, comparable to a rivet, is formed on the end regions of the reinforcing elements (see FIG. 1b). To form a flat surface, this bead is then pressed into the foam material 2 and fused therewith.

Using the method according to the disclosure herein, sandwich panels 10 can thus be formed that have a reinforced foam core 5 made of thermoplastic polymers. Usually, it is only thermosetting foam materials that are used to produce sandwich panels, e.g. "tied foam core" methods or similar methods, in which dry fibers are inserted into a thermosetting foam material and are then infiltrated with a plastics matrix. Using the present disclosure, it is now possible to produce thermoplastic sandwich panels having mechanical properties that are comparable to thermosetting sandwich panels or sandwich panels having a honeycomb core. For example, the pressure resistance and shear resistance of the sandwich panels can be optimised by the reinforcing elements 1.

Furthermore, however, thermoplastic polymers used have many advantages; in particular, they can be formed into almost any shape very easily and with little complexity. By contrast, honeycomb structures can only be handled by machines with difficulty, and therefore they are often processed manually. At the same time, structures that are curved multiple times are very rarely produced in this case. Generally, it is extremely complex to produce honeycomb panels of this type. Sandwich structures comprising cores made of foamed polymers provide more cost-effective processing properties and a wider range of options for shaping. These structures can be brought into almost any conceivable shape. Foam materials made of thermoplastic polymers according to the present disclosure may also be deformed into any shape under the effects of pressure and temperature, and can be joined to thermoplastic cover layers in short cycle times. Therefore, the present methods provide for production of complex-shaped sandwich structures in short cycle times.

The methods and sandwich panels which have been described can be used in all sectors of the transport industry, for example for aircraft, road vehicles, for rail vehicles or for watercraft. Furthermore, sandwich panels of this type can be used in many other sectors, e.g. in the construction industry and furniture industry, etc.

In the description above, various features have been combined in one or more examples in order to improve the conciseness of the explanation. However, it should be clear that the above description is purely for illustrative purposes, but is in no way limiting. It covers all alternatives, modifications and equivalents of the various features and embodiments. Many other examples will be immediately and directly clear to a person skilled in the art reading the above description, on account of his knowledge in the art.

The embodiments have been selected and described in order to be able to set out, in the best possible way, the principles on which the disclosure herein is based, and the possible applications thereof in practice. As a result, persons skilled in the art can modify and use the disclosure herein and the various embodiments thereof in an optimal manner with regard to the intended use. In the claims and the description, the terms "containing" and "having" are used as neutral terms for the corresponding term "comprising". Furthermore, use of the terms "a", "an" and "one" is not in principle intended to exclude a plurality of such described features and components.

While at least one exemplary embodiment of the present disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a sandwich panel comprising a reinforced foam core, comprising:
    inserting a plurality of rod-shaped, thermoplastic reinforcing elements into a thermoplastic foam material such that the reinforcing elements extend from a first cover surface of the foam material, through the foam material, to a second cover surface of the foam material, wherein end regions of the reinforcing elements project out of the first cover surface and the second cover surface;
    thermoforming the foam material comprising the reinforcing elements to form a reinforced foam core, wherein the end regions of the reinforcing elements are integrally bonded to the foam material in a fused connection by applying temperature and pressure to the cover surfaces of the foam material, and wherein the end regions of the reinforcing elements are reshaped and pressed into the foam material to form a flat surface; and
    laminating a first thermoplastic cover layer on the first cover surface and laminating a second thermoplastic cover layer on the second cover surface by applying temperature and pressure to the reinforced foam core on the first cover surface and the second cover surface of the foam material in order to form the sandwich panel, wherein the first thermoplastic cover layer and the second thermoplastic cover layer are bonded to the reinforced foam core in a fused connection.

2. The method of claim 1, further comprising:
forming a plurality of through-holes in the foam material which extend from the first cover surface of the foam material to the second cover surface of the foam material, wherein the reinforcing elements are inserted into the through-holes.

3. The method of claim 2, wherein the through-holes are formed by melting the foam material.

4. The method of claim 3, wherein the foam material is melted using a laser.

5. The method of claim 1, wherein at least one of the end regions of each of the reinforcing elements comprises a pointed end.

6. The method of claim 5, wherein the through-holes are formed by perforating the foam material using the pointed end regions of the reinforcing elements.

7. The method of claim 1, wherein the end regions of the reinforcing elements project to an equal extent out of the first cover surface and the second cover surface.

8. The method of claim 1, wherein the reinforcing elements inserted into the foam material are secured in the foam material by a frictional connection.

9. The method of claim 1, wherein laminating the first thermoplastic cover layer onto the first cover surface and laminating the second thermoplastic cover layer onto the second cover surface is performed concurrently with the application of temperature and pressure for thermoforming.

10. The method of claim 1, wherein thermoforming on either side is carried out by a press.

11. The method of claim 1, wherein the laminating on either side is carried out by a press.

12. The method of claim 1, wherein at least one of the reinforcing elements, the foam material and the cover layers each contain a thermoplastic polymer.

13. The method of claim 12, wherein the reinforcing elements, the foam material and the cover layers each contain a same thermoplastic polymer.

14. The method of claim 12, wherein the reinforcing elements contain reinforcing fibers which are embedded in a respective thermoplastic polymer.

15. The method of claim 12, wherein the cover layers contain reinforcing fibers which are embedded in a respective thermoplastic polymer.

16. The method of claim 12, wherein a respective thermoplastic polymer is selected from the group consisting of acrylonitrile butadiene styrene, polyamide, polybutylene terephthalate, polycarbonate, polyether ether ketone, polyetherimide, polyethersulfone, polyethylene terephthalate, polypropylene, polyphenylene sulfide, polyphenylsulfone and polysulfone.

* * * * *